May 6, 1969  D. J. MURAUSKAS  3,442,515

OPPOSED FACE NON-EXTRUSION SEAL

Filed Sept. 6, 1966

INVENTOR.
DONALD J. MURAUSKAS
BY
McNENNY, FARRINGTON, PEARNE & GORDON

ATTORNEYS

United States Patent Office 3,442,515
Patented May 6, 1969

3,442,515
OPPOSED FACE NON-EXTRUSION SEAL
Donald J. Murauskas, Cleveland, Ohio, assignor to The Weatherhead Company, Cleveland, Ohio, a corporation of Ohio
Filed Sept. 6, 1966, Ser. No. 577,338
Int. Cl. F16j 15/40, 15/16; F16l 17/00
U.S. Cl. 277—27                                            8 Claims

ABSTRACT OF THE DISCLOSURE

An annular face seal for sealing against fluid pressure loss from a body having a passage therethrough exposed to fluid pressure and a face extending radially from the passage. An annular groove in the face is provided with an O-ring adjacent its inner axial wall, and a back-up ring between the O-ring and the outer axial wall. The outer axial wall and the adjacent side of the back-up ring have cooperating camming surfaces operable under a radially outward force applied to the back-up ring to tend to force the back-up ring axially out of the groove. The O-ring is operable to apply the radial outward force to the back-up ring when the fluid pressure being sealed against is applied to the inner side of the O-ring.

---

Figure 1:
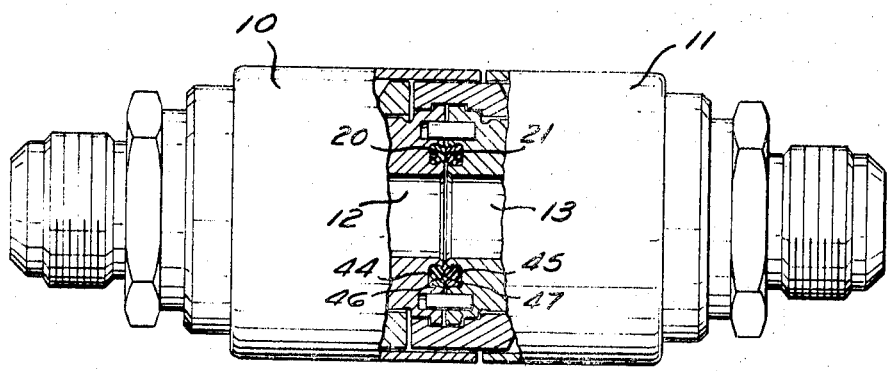

This invention relates generally to fluid seals and more particularly to face seals particularly adapted to resist extrusion while sealing against high fluid pressure.

Face seals are widely used in many applications such as in quick-release couplings, both valved and unvalved, and particularly in couplings, of the self-mating type in which both halves are identical so that the coupling ends are interchangeable. In such couplings, it has been common practice to provide an annular groove on the face of the coupling outward of the bore in which the seal is mounted. Heretofore, O-rings have been placed in the groove, but problems are encountered in retaining the O-ring in place. When the coupling is assembled, there is usually a clearance between the faces outwardly of the O-ring seal so that high pressures tend to extrude the seal outwardly into this space so that sealing contact is broken. Furthermore, when the coupling halves are apart the O-ring may fall out of the groove and become lost. This may also happen when a coupling is disassembled because the O-ring on one half may stick to the O-ring on the other half so that one of the rings is removed from its coupling. In addition, the leakage of high pressure beneath the O-ring within the recess may, on uncoupling, cause a sudden expansion which tends to blow the O-ring out of the recess.

These problems are overcome in the present invention by providing a recess having a radial width greater than that of the O-ring which has a diameter to fit against the radially inner wall of the recess. An overhanging lip on the recess resists outward movement of the O-ring, and the recess can be vented to the interior of the couplings. Radially outward of the O-ring is provided a back-up ring of a relatively rigid sealing material which retains the O-ring against outward radial movement, and the retaining ring and the radially outer wall of the recess are provided with interlocking surfaces to retain the retainer ring in place after it has been inserted with a snap action by slight compression of the O-ring. The interlocking surfaces on the retaining ring and the recess wall are sloped to provide a wedge-like cam action so that radially outward pressure on the retaining ring tends to move it out of the groove in an axial direction to increase the sealing contact pressure.

It is therefore a principal object of this invention to provide a novel and improved high pressure face seal which is arranged to seal by making sealing engagement either with a planar surface or another identical seal.

It is another object of this invention to provide a novel face seal employing an elastomeric O-ring and a relatively rigid back-up ring which fit together in an annular groove and which is arranged to cooperate with the O-ring and back-up ring to retain them in place against axial movement out of the groove.

It is another object of this invention to provide a novel face seal employing a relatively rigid back-up ring having a wedge-like shape which cooperates with a camming surface in the wall of the groove within which the back-up ring is mounted so that radial force applied to the back-up ring results in an axial movement increasing the face sealing contact pressure of the back-up ring.

It is another object of this invention to provide a novel face seal employing an elastomeric O-ring seal and a back-up ring which is arranged to be vented to the interior of the coupling both to provide balanced force on the O-ring and to prevent blowout of the seal upon sudden release of pressure.

It is still another object of this invention to provide a novel face seal as set forth in the preceding objects which is simple and low cost of construction to allow easy assembly and replacement while lending itself to low cost of manufacture without sacrifice of durability and performance.

Further objects and advantages of this invention will become apparent upon a more complete understanding of the invention as shown in the drawings and described in the following detailed description.

Figure 2:
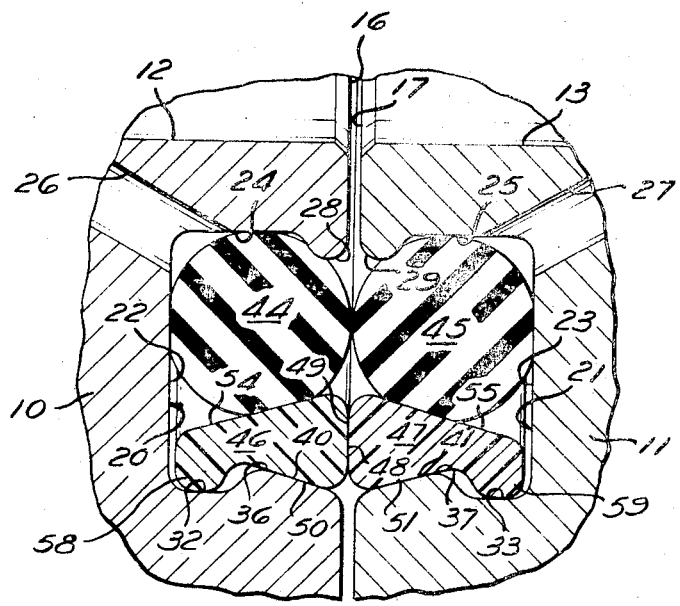

In the drawings:

FIGURE 1 is an elevational view partially in section of a self-mating coupling incorporating the face seal of the present invention; and FIGURE 2 is an enlarged cross-sectional view of the seal shown in FIGURE 1.

Referring now to the drawings in greater detail, the coupling has been shown by way of example as being of the self-mating type in which each half is provided with a seal according to the invention so that the seals make sealing contact with each other. However, the seal can likewise be used in other types of couplings and may make sealing contact with a planar sealing face rather than another seal when the coupling halves are dissimilar.

The coupling shown in FIGURE 1 for purposes of illustration is a quick disconnect valved coupling which apart from the seal of this invention may be constructed as disclosed in the co-pending application of William G. Cerbin, Ser. No. 437,800 filed Mar. 8, 1965. Couplings of this type have two identical halves 10 and 11 which connect with each other and upon actuation have internal valves that open to permit fluid flow through the passages 12 and 13 in the coupling halves 10 and 11. It is necessary to provide a seal at the mating faces 16 and 17 to prevent fluid leakage from the passages 12 and 13. It will be understood that since the coupling halves are identical, the seal in each half as hereinafter described will be the same.

The coupling halves 10 and 11 are provided with annular seal receiving grooves 20 and 21 in the faces 16 and 17 radially outward of the passages 12 and 13. The grooves 20 and 21 have a generally rectangular cross-sectional shape having inner radial walls 22 and 23 which at their ends away from faces 16 and 17 are joined to axially extending inner walls 24 and 25 respectively. At various points around the periphery of the grooves 20 and 21 passages 26 and 27 connect between the inner ends of the grooves and the passages 12 and 13 for pressure venting purposes as will be described in greater detail hereinafter. The inner walls 24 and 25 extend toward the faces 16 and 17 where they terminate in rounded radially extending lips 28 and 29 in the form of rounded beads or ridges to aid in retaining the sealing rings in place. At the outer end of the radial walls 22 and 23, the groove has axially extending outer walls 32 and 33 which terminate substantially midway between the radial walls 22 and 23 and the faces 16 and 17 in inwardly extending annular ribs 36 and 37. These ribs 36 and 37 have steeply sloping re-entrant inner surfaces and cam surfaces 40 and 41 which slope radially outwardly toward the coupling faces 16 and 17.

O-rings 44 and 45 are located within the grooves 20 and 21 and have a diameter to fit in the radially inner portions of the grooves adjacent the inner axial walls 24 and 25. With the O-rings 44 and 45 in this position, the lips 28 and 29 serve as retainers to prevent outward movement of the O-rings.

Radially outwardly of the O-rings 44 and 45, the grooves 20 and 21 receive back-up rings 46 and 47. These back-up rings 46 and 47 are preferably made of a fairly rigid elastomeric material, such as polytetrafluoroethylene and serve both to provide additional sealing and to prevent extrusion under high pressure of the relatively soft elastomeric O-rings 44 and 45. These back-up rings 46 and 47 have radially extending outer faces 48 and 49 which meet in abutting engagement when the seals are in contact with each other. These back-up rings 46 and 47 on their radially outer sides are provided with surfaces 50 and 51 which normally extend substantially parallel to the cam surfaces 40 and 41 of the grooves. On their radially inner sides the back-up rings 46 and 47 are likewise provided with sloping surfaces 54 and 55 so that these portions of the back-up rings are substantially wedge shaped to taper toward each other away from the outer faces 48 and 49. In addition, the back-up rings 46 and 47 are provided with outwardly projecting retaining tab portions 58 and 59 which are adapted to abut against the outer groove walls 32 and 33 and to engage the re-entrant sides of ribs 36 and 37 to limit axial movement of the back-up rings as will be described hereinafter.

It will be understood that apart from the passages 26 and 27, the grooves as well as the O-rings 44 and 45 and the back-up rings 46 and 47 have a uniform cross-sectional shape throughout their entire annular extent. Therefore, when the coupling members are assembled and latched together, the seals engage each other as shown in FIGURE 2 with the O-rings 44 and 45 in abutting engagement and the outer faces 48 and 49 of the back-up rings 46 and 47 likewise being in engagement. Since there is a clearance between the coupling faces 16 and 17, the fluid within the passages 12 and 13 will tend to pass outward toward the O-rings 44 and 45. This same fluid pressure is communicated through the venting passages 26 and 27 so that all portions of the radially inner sides of the O-rings 44 and 45 are subject to the fluid pressure being sealed against. This results in a balanced axial force on the O-rings and a net outward radial force which tends to press the O-ring against the back-up rings 46 and 47. The outer sides of the O-rings 44 and 45 therefore make contact with inner surfaces 54 and 55 of the back-up rings and apply to these surfaces a force substantially parallel to the plane of the faces 16 and 17.

Since the surfaces 54 and 55 are wedge shaped, the force applied to them through the O-rings 44 and 45 will tend to result in a force component forcing the back-up rings toward each other to increase the contact pressure between the faces 48 and 49. Because this force is applied through the back-up ring, the wedging action obtained between the surfaces 50 and 51 and the cam surfaces 40 and 41 in the groove, this wedging action is further increased by a factor resulting from the total angle between the respective pairs of faces 50 and 51 and 54 and 55, respectively. Thus, the greater the force applied to the O-ring the greater the force component of the back-up rings forcing them toward each other so as to provide an additional seal at this point and positively prevent extrusion of the O-ring past the back-up rings.

When the couplings are disassembled any fluid trapped behind the O-rings 44 and 45 is released to the atmosphere either through the open face of the seal grooves 20 and 21 or through the passages 26 and 27 so that the O-rings may return to their positions as shown in FIGURE 2. In this position, the rounded lips 28 and 29 together with the back-up rings 46 and 47 serve to retain the O-rings 44 and 45 in position, because the sloping surfaces 54 and 55 of the back-up rings 46 and 47 prevent outward movement of the O-rings. The back-up rings 46 and 47 are further retained within the grooves because of the contact between the retainer tab portions 58 and 59 with the inner sides of the ribs 36 and 37. Thus, not only does the seal perform effectively under high pressure, but both the O-ring and back-up ring elements effectively retained within the grooves when the coupling members are separated.

Although the seal of this invention has been shown as applied to identical halves of coupling members, so that the two seals engage each other, it is understood that in other types of couplings the combination of the O-ring and the back-up ring of this invention with the shape of the groove may operate to seal against a planar face, and this coupling would be operative if, for example, the face 17 was smooth and uniform across the full extent without containing the groove and opposing seal. In such case, the pressure applied to both the O-ring 44 and the back-up ring 46 would be exerted against a smooth sealing face and the seal would otherwise operate in the same manner as described hereinabove.

Although the preferred embodiment of this invention has been shown and described in detail, it is recognized that upon full comprehension of this invention, various modifications and rearrangements will suggest themselves to those skilled in the art and may be resorted to without departing from the scope of the invention as defined in the claims.

What is claimed is:

1. An annular face seal for a body having an annular face comprising an annular groove in said face, said groove having a radially extending wall and inner and outer axially extending walls, an O-ring in said groove adjacent said inner axially extending wall, a back-up ring in said groove between said O-ring and said outer axially extending wall, said outer axially extending wall and the adjacent side of said back-up ring having cooperating camming surfaces extending radially and axially outward, whereby a radially outward force applied by said O-ring to said back-up ring tends to force said back-up ring axially out of said recess, means to balance fluid pressure on the inner side of said O-ring adjacent said face and said radially extending wall, and said outer axially extending wall and said adjacent side of said back-up ring having interlocking engaging surfaces positioned intermediate said face and said radially extending wall to prevent axial movement of said back-up ring out of said recess.

2. A face seal as set forth in claim 1 including an annular rib on said inner axial wall adjacent said face extending radially into said groove.

3. A face seal as set forth in claim 1 wherein said interlocking engaging surfaces include a re-entrant surface on said outer axial wall and a projecting retaining tab on said back-up ring.

4. An annular face seal for a body having an annular face, comprising an annular groove in said face, said groove having a radially extending wall and inner and outer axially extending walls, an O-ring in said groove adjacent said inner axially extending wall, a back-up ring in said groove between said O-ring and said outer axially extending wall, said O-ring applying a radially outward force to said back-up ring means to balance fluid pressure on the inner side of said O-ring adjacent said face and said radially extending wall, said outer axially extending wall and the adjacent side of said back-up ring having cooperating camming surfaces extending radially and axially outward, whereby said radially outward force applied to said back-up ring tends to force said back-up ring axially out of said recess.

5. A face seal as set forth in claim 4 wherein the inner side of said back-up ring adjacent said O-ring slopes inwardly toward said face to increase the effective axial force applied to said back-up ring by radially outward movement of said O-ring.

6. A face seal as set forth in claim 4 wherein said outer axial wall is provided with an inwardly projecting rib intermediate said radial wall and said face whereby the axially outer portion of said rib comprises said camming surface and said outer axial wall has a re-entrant portion between said rib and said radial wall, and said back-up ring has a projecting tab extending into said re-entrant portion to limit axial movement of said back-up ring.

7. A face seal as set forth in claim 6 including an annular rib on said inner axial wall adjacent said face extending radially into said groove to retain said O-ring within said groove.

8. An annular face seal for a body having a passage therethrough exposed to fluid pressure and a face extending radially from said passage, an annular groove in said face around said passage, said groove having a radial wall and inner and outer axial walls, an O-ring in said groove adjacent said inner axial wall, a back-up ring in said groove between said O-ring and said outer axial wall, an annular inner rib on said inner axial wall adjacent said face extending radially into said groove to retain said O-ring within said groove, vent means connecting the inner side of said radial wall to said passage to balance the fluid pressure applied to said O-ring, said outer axial wall having an inwardly projecting outer rib intermediate said face and said radial wall, said outer rib defining a radially outwardly sloping camming face extending toward said face and a re-entrant portion adjacent said radial wall, said back-up ring being formed with a sloping camming surface overlying and engaging the camming surface on said outer rib, said back-up ring being provided with an outwardly projecting retaining tab portion adjacent said radial wall and extending into said re-entrant portion to limit axial movement of said back-up ring, and said back-up ring being formed with an inner side sloping radially inwardly toward said face, whereby said retaining tab and said re-entrant portion retains said back-up ring within said groove and said inner side of said back-up ring and said inner rib retain said O-ring in said groove and radial outward movement of said O-ring forces said back-up ring axially out of said groove to increase the sealing force applied by the portion of the said back-up ring adjacent said face.

References Cited

UNITED STATES PATENTS

| | | | |
|---|---|---|---|
| 2,710,206 | 6/1955 | Huber | 277—92 |
| 3,004,807 | 10/1961 | Kniepkamp | 277—82 X |
| 3,180,648 | 4/1965 | Kupfert et al. | 277—92 |
| 3,189,357 | 6/1965 | Talamonti | 277—42 |

LAVERNE D. GEIGER, *Primary Examiner.*

JEFFERY S. MEDWICK, *Assistant Examiner.*

U.S. Cl. X.R.

277—71, 92, 143, 165; 285—99